Patented Feb. 8, 1938

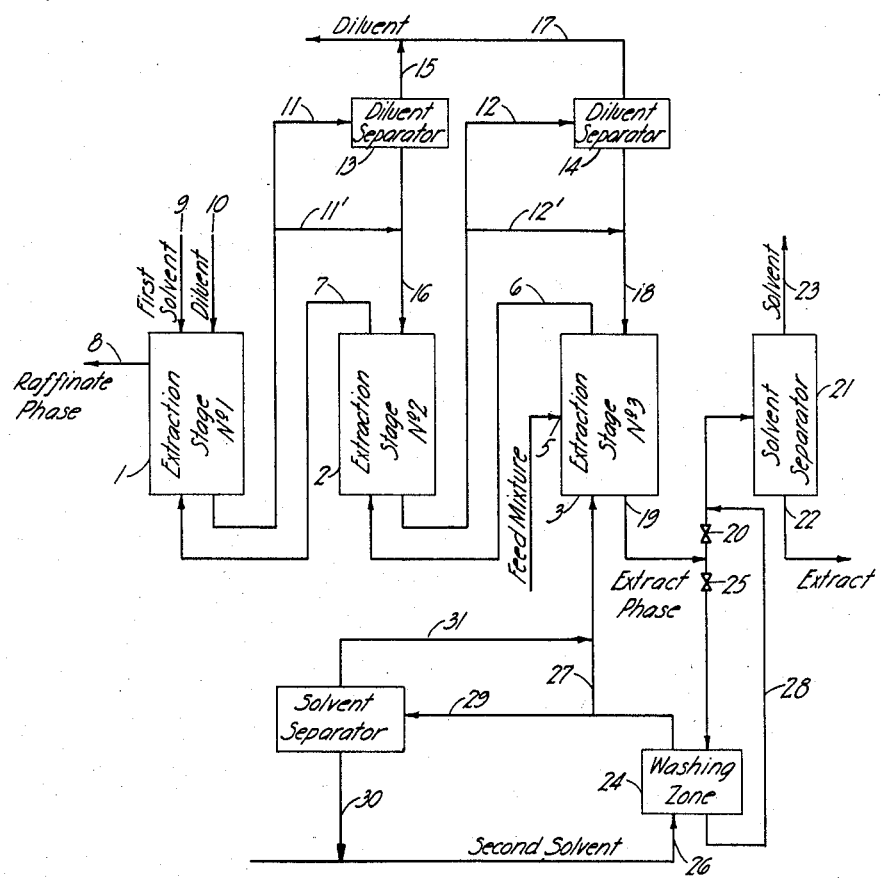

2,107,681

UNITED STATES PATENT OFFICE 2,107,681

EXTRACTION PROCESS

Willem J. D. van Dijck, The Hague, Netherlands, assignor to Shell Development Company, San Francisco, Calif., a corporation of Delaware Application March 18, 1935, Serial No. 11,647

11 Claims. (Cl. 196—13)

This invention relates to an improved process for the separation of liquid mixtures and particularly of hydrocarbon oils into their components by extraction and more specifically comprises an improvement in the methods of extracting said mixtures with a selective solvent in the presence of a diluent.

In the solvent extraction of liquid mixtures a selective solvent is contacted, countercurrently if desired, with a mixture in an extraction zone; the resulting mixture is permitted to separate into a raffinate or solvent-poor phase, and an extract or solvent-rich phase, and the two phases are separately withdrawn from the extraction zone. The resulting extract phase may often be washed or extracted, countercurrently if desired, with a second solvent preferentially dissolving those components of the mixture which are less soluble in the first solvent, as described, for example, in my U. S. Patent No. 2,023,109. The solvent or solvents may then be removed from either or both of the separated phases by any suitable method, such as distillation, or by washing with suitable extracting agents, or by absorption, etc., to produce pure raffinate and extract. It may sometimes be preferred to permit a portion of the solvent to remain with the products, as when the solvent improves the properties of these products, e. g. when it improves the anti-knock properties of gasoline or Diesel fuel oil.

As an improvement on this art, non-selective diluents are often introduced together with a selective solvent into the extraction zone to aid the separation of the phases and to alter the distribution characteristics of the components of the mixture being extracted with respect to the phases produced. Processes of this type are described in the U. S. Patent Nos. 1,945,516 and 2,053,485. These diluents are preferably of the nature of the components preferably soluble in the solvents used and must be capable of being separated from the solvents and from the substances being extracted by a treatment outside of the extraction zone; distillation may be used for this purpose.

According to the process of the invention one or more substances having the following properties are used as diluents:

1. They must have a greater solvent power than the selective solvent used;

2. When mixed with the extraction mixture (solvent + initial mixture) and after two layers have been formed, they should preferably be present in the layer rich in solvent (extract phase).

The diluents may be gases, vapours, liquids or solids at standard conditions ($t=20°$ C. and $p=760$ cm. Hg.) or at the temperature or pressure at which the extraction is carried out.

In case they are gases or vapours it is possible that a sufficient amount of them is dissolved in the solvent used to improve the extraction.

If they are solids a sufficient quantity of them may be dissolved without the solvent used being made e. g. too viscous.

It is an object of my invention to substantially reduce the volume of extractants required in the extraction processes employing diluents, while improving the purity and/or the yield of the products obtained, by controlling the concentration of the diluent at various stages of the extraction process. Other objects will be apparent from a reading of this specification.

Briefly, my invention consists of extracting a liquid mixture of components with a selective solvent (which term is hereinafter used to include both single solvents and solvent mixtures) in a continuous or semi-continuous countercurrent manner in the presence of a diluent of the types mentioned above, while maintaining gradually or stepwise diminishing concentrations of the diluent in the direction of flow of the selective solvents; this is accomplished by removing at least a portion of the diluent from the extract phases produced at one or several consecutive stages of the treatment.

The degree of phase separation and the purity of the resulting raffinate freed of the solvent and the diluent is enhanced by the presence of a diluent in the extraction mixture from which the raffinate is derived. The corresponding extract, however, will generally be purer when this diluent is not present. By operating in accordance with my invention both of these desired conditions are obtained, and, under otherwise identical conditions, it is possible to obtain purer raffinates and extracts and/or a greater yield of the raffinates than was possible heretofore.

My invention may be more fully understood from the following detailed description and drawing, which is a flow sheet illustrating one embodiment of my invention.

In the drawing reference characters 1, 2 and 3 designate extraction stages of a multistage extraction treater, and 13 and 14 designate separators, such as fractionating columns, all interconnected, as shown and as hereinafter described, and provided with pumps, valves, heat exchangers and other auxiliary equipment not shown. A feed mixture, such as a lubricating oil fraction, is introduced through inlet 5 into the last stage. Raffinate phases produced in stages 3 and 2 pass through conduits 6 and 7 into stages 2 and 1 respectively. The raffinate phase from stage 1 is withdrawn at 8. The selective solvent and diluent are introduced into stage 1 through inlets 9 and 10 respectively, although they may be mixed prior to their introduction. The extract phases produced in the stages 1 and 2 pass through conduits 11 and 12 and into diluent separators 13 and 14 respectively. In the diluent separator 13 a portion of the diluent is removed from the extract phase and may be returned through a conduit 15 to the diluent storage, while the balance of the extract phase is led to the stage 2 through a conduit 16. Similarly, in the diluent separator 14 diluent is withdrawn through a conduit 17 and the remaining portion of the extract phase is led to the stage 3 through a conduit 18. Any number of stages may be provided, and it is often advantageous to operate the process so that the extract entering the last stage or series of stages is substantially free of diluent. It may often be desirable to by-pass a portion of the withdrawn extract phase through conduits 11' and/or 12' and to operate the diluent separators 13 and/or 14 to remove substantially all of the diluent from that portion of the extract phase which is not by-passed. It is, moreover, often possible to recover the solvent at a single point in the system, thereby eliminating one diluent separator. For example, if the diluent separator 13 is eliminated, the extract phase which is withdrawn from the extraction stage 1 is introduced directly into the second stage through conduit 11'. The final extract phase is withdrawn at 19, allowed to flow through valve 20 and freed of the solvent in a solvent separator 21; the resulting extract is discharged at 22, solvent being withdrawn at 23. The recovered diluent and/or solvent may be reused. An additional diluent separator may be used to remove diluent either from the extract phase leaving the stage 3 or from the solvent leaving solvent separator 19, if the diluent separator 14 is not operated to remove all of the diluent and it is desired to recover pure solvent.

Furthermore the extract phase withdrawn from the stage 3, i. e. where the feed is introduced, may be extracted as already explained, with a second solvent, which may be immiscible with the first solvent, to concentrate further the components soluble in the first solvent. This additional extraction or washing of the extract phase may be carried out in a washing zone 24 which may comprise contact and phase separating means, or a series of extracting stages or a single countercurrent or batch treater. For this purpose valve 20 may be closed and valve 25 opened. A second solvent may be introduced at 26, and the raffinate phase produced in the washing zone 24 is returned to the extraction stage 3 through a conduit 27 and introduced either near one end thereof, as shown, or together with the feed mixture at inlet 5. It is, moreover, often desirable to recover all or a portion of the second solvent from the raffinate phase which is produced in the washing zone 24 before returning it to the extraction stage 3. This may be effected by passing it through a solvent separator 29 and withdrawing the second solvent at 30. The remaining portion is returned to the extraction zone through a conduit 31. The ultimate extract phase is passed on to the solvent separator 21 through a conduit 28 and treated in the manner heretofore described to separate the extract, the solvent and the residual diluent. In some cases the second solvent may be introduced directly into the zone receiving the mixture to be extracted.

It is not necessary that the second solvent is immiscible with the first solvent; it should only form two layers when brought together with the extract phase withdrawn from the stage 3.

It is possible to treat the extract phase in the washing zone with a second solvent consisting wholly or substantially of the component or components of the feed mixture most readily soluble in the first solvent, i. e. the pure extract component 22. Also in that case the raffinate produced in the washing zone 24 may be returned to the extraction stage 3 through a conduit 27.

The extract phase withdrawn from the stage 3, though free from raffinate components, may consist of several components. These may also be separated in a washing zone with the aid of another solvent. It is evident that in the latter case the raffinate obtained in the washing zone is not led back into the extraction stage, seeing that neither said raffinate nor the ultimate extract obtained in the zone 24 contains components belonging to the ultimate raffinate phase leaving the extraction system at 8.

As will be evident, the above process can be carried out only if the pure extract components of the withdrawn extract phase behave differently with regard to the second solvent used. The extract phase obtained in stage 3 is then considered as a new liquid mixture to be treated with a new (first) solvent. After the treatment with the second solvent, several modes of which have been described above, the raffinate as well as the extract obtained thereby may be subjected to a treatment with a third solvent. The treatment with the third solvent may be applied to effect a separation analogous to that obtained with the first solvent.

While I have illustrated a process in which a diluent is added to one selective solvent, in some cases it may be desirable to use a diluent with each of the two counterflowing solvents, and to maintain a gradually diminishing concentration of at least one diluent in the direction of flow of the corresponding solvent. Suitable diluent separators would then be provided and arranged to remove a portion of the diluent from raffinate phases produced at one or several stages of the treatment, similar to the diluent separators 13 and 14.

Numerous modifications may be made in my process. Thus it is possible to operate with a temperature gradient, i. e. employing progressively lower temperatures in consecutive stages along at least a part of the way of flow of the selective solvent, and/or at a different pressure in each stage. Any number of stages may be provided for the extraction as well as for the washing zones. If a temperature gradient is used in the process whereby the extract phase leaving the final extraction stage is washed with a second solvent, immiscible with the first, so as to remove raffinate components from said extract phase, it is often preferable to choose the lowest temperature at the point of entrance of the feed mixture into the extraction system and gradually or stepwise to increase the temperature in the direction of the point of entrance of the first solvent as well as in that of the point of entrance of the second solvent. This may be done e. g. by feeding the solvent hot and by gradually cooling the middle stages of the system. Alternatively a single column may be used, and the extract phase or a mixture of phases, i. e. extraction mixture, withdrawn at one or several points along the side of the column, freed of a portion of the diluent and reintroduced at a point near the point of its withdrawal.

A semi-continuous mode of operation may also be used. In this operation the solvent, diluent and feed mixture may be intermingled in a single mixer and allowed to settle. The raffinate is then withdrawn by decantation or other suitable means, the diluent content of the remaining extract phase is decreased, for example, by distillation and the diluent-poor extract phase is allowed to separate into two new phases, which are again separated. By successive treatments of this type followed by complete removal of the solvent an extract of improved composition will be produced.

All kinds of processes to remove the diluents may be used, both chemical and physical. In the diluent separator the diluent may be retained by chemical action or it may be separated out by cooling and/or crystallization. A distillation is also possible.

My invention may be used with any solvent or solvent mixtures. Examples of main or naphthenic solvents suitable for the extraction of hydrocarbon mixtures, such as mineral oils, are: sulphur dioxide, phenol, nitrobenzol, ethanol amines, furfural, $\beta\beta'$ dichlorethyl ether, quinoline, isoquinoline, nitrogen bases, etc., either alone or together with other solvents, such as alcohols, ketones, etc. They can be used in conjunction with second or paraffinic liquid solvents, such as propane, butane, pentane, light naphthas, etc.

My invention may be applied to the treatment of all kinds of hydrocarbon oils, either natural or synthetic, e. g. those obtained by polymerization, condensation or cracking. Apart from carbon and hydrogen they may contain other elements, such as sulphur, nitrogen, oxygen and/or metals; these will be called foreign elements. The hydrocarbon oils may contain sulphonic acids, naphthenic acids, phenols or metal compounds of these substances. As a rule the components containing the foreign elements in their molecule will pass into the phase rich in the first solvent used (i. e. the selective or naphthenic solvent). In those cases the solvent-rich phase, when free from paraffinic constituents, will contain naphthenic constituents and e. g. sulphur compounds. By using another solvent the said phase can be separated, thereby obtaining either a separation between the naphthenic constituents and the compounds containing the foreign elements, or between the various compounds containing foreign elements if the extract phase contains a plurality of these compounds. The compounds containing foreign elements as well as the naphthenic constituents fall under the definition "first group of components", occasionally used in the claims.

If, therefore, a treatment of hydrocarbon oils containing foreign elements has been carried out in the apparatus as illustrated in the drawing, the final extract phase leaving the washing zone 24 through the conduit 28 may be treated again with a third solvent, in which one or more of the components will preferably dissolve.

Considering that the said extract phase may contain the first solvent, naphthenic constituents and compounds containing foreign elements, e. g. sulphur compounds or nitrogen bases, the third solvent with which it can be treated may dissolve only the sulphur compounds. It is also possible that it dissolves the first solvent as well as the sulphur compounds; this depends on the character of the extract phase to be further treated as well as on that of the third solvent. The third solvent may also act chemically on one of the components of the extract phase, though preferably it should bind itself only loosely to one of the components of the extract phase, so as to render it very easy to recover the third solvent.

It is to be understood that my invention is not limited to the use of any of the specific solvents or solvent mixtures mentioned above, but that it may be used with advantage to improve the extraction of any hydrocarbon mixture containing paraffinic and non-paraffinic components with any solvent or solvent mixtures. In the extraction of hydrocarbon mixtures to remove aromatic constituents therefrom the diluents used in my process are generally of an aromatic nature. Examples of such diluents are: benzol, its homologues and analogues, various aromatic concentrates, such as obtained by solvent extractions of gasolines, naphthas, kerosenes and other mineral oil distillates, pure bicyclic or polycyclic hydrocarbons, their mixtures or mixtures containing effective concentrations of these hydrocarbons and derived, for example, from petroleum oils or prepared synthetically, examples of the latter being naphthalene and benzol, naphthalene diphenyl and naphthalene. My invention is not, however, limited to the specific diluents recited, but may be used to advantage with any liquid, such as ether, carbon disulphide, chloroform, or solid substance which may be readily separated from the extract phase and which is substantially soluble in the solvent being treated at the temperature of extraction. It may also be soluble in the solution being treated.

The invention also is not limited to extraction of hydrocarbons, but can be applied in extracting any solutions of several substances, which can be separated from each other by solvent extraction, the selection of suitable solvents and diluents being within the skill of experts. Thus, refining of vegetable oils by solvent extraction, or concentration of aqueous solutions of lower organic acids by extraction with suitable solvents, such as some ethers, and many other solvent extraction treatments are subject to improvement by the method of operation according to this invention and are to be included within the scope of the appended claims.

To be useful as diluent a liquid should be soluble in the solvent which it dilutes, though it is not necessary that it is fully miscible therewith in all proportions. It is not necessary either that it is soluble in the solvent-poor phase.

As used in the present specification and claims the term "extraction zone" is used to designate the aggregate of all zones or stages used in the process. Thus, in referring to the process illustrated by the drawing, this term includes all three stages. Washing zones may also be included. The term "component" is not limited to pure substances but includes groups of substances having generally similar characteristics with respect to a particular solvent.

I claim as my invention:

1. The process for extracting a liquid mixture to remove a component therefrom, which comprises extracting said mixture in an extraction zone by flowing it countercurrently to and in contact with concurrent streams of a selective solvent and a diluent having a greater solvent power than and preferentially dissolved in the solvent under conditions producing raffinate and extract phases, and withdrawing diluent from the extraction mixture at at least one intermediate point of the extraction zone.

2. The process which comprises flowing a hydrocarbon mixture containing paraffinic and non-paraffinic components in an extraction zone countercurrently to concurrent streams of a selective solvent for non-paraffins and a diluent having a greater solvent power than and preferentially dissolved in the solvent under conditions producing raffinate and extract phases, withdrawing at least a portion of the extraction mixture at successive intermediate points of the extraction zone, removing diluent from the withdrawn mixtures, and returning the remaining portions containing less diluent to the extraction zone at points near the corresponding points of withdrawal.

3. The process for removing non-paraffinic constituents from a hydrocarbon mixture containing them, which comprises flowing said hydrocarbon mixture in a multistage extraction treater countercurrently to concurrent streams of a solvent for non-paraffinic constituents and an aromatic diluent under conditions which cause the formation of raffinate and extract phases, and removing diluent from the extract phase between successive stages of the extraction.

4. The process for treating a liquid mixture containing a first component and a second component in an extraction zone to separate its components, which comprises introducing said mixture into the extraction zone at an intermediate point thereof, counterflowing the said mixture and concurrent intermingled streams of a solvent for said first component and a diluent having a greater solvent power than and preferentially dissolved in the said solvent under conditions producing raffinate and extract phases, removing at least a portion of the diluent from the extract phase at at least one intermediate point of the extraction zone, and flowing the remaining portion of the extract phase countercurrently to a solvent for the said second component under conditions causing the formation of new raffinate and extract phases.

5. The process for treating a liquid mixture containing a first component and a second component in an extraction zone to separate its components, which comprises introducing said mixture into the extraction zone at an intermediate point thereof, introducing concurrent intermingled streams of a solvent for said first component and a diluent having a greater solvent power than and preferentially dissolved in the said solvent near one end of said zone, counterflowing the said mixture and the solvent under conditions producing raffinate and extract phases, removing diluent from the extract phase at at least one intermediate point of the extraction zone, flowing the remaining portion of the extract phase through that part of the extraction zone situated between the point of introduction and the other end of the extraction zone, countercurrently to a second solvent for the said second component introduced near said end of the extraction zone, under conditions producing a phase rich in said second solvent and a phase poor in said second solvent, removing second solvent from the phase rich in said second solvent and returning the remaining portion of this phase to the extraction zone.

6. The process for removing non-paraffinic constituents from a hydrocarbon mixture containing them, which comprises introducing said hydrocarbon mixture into an extraction zone at an intermediate point thereof, introducing concurrent intermingled streams of a solvent for non-paraffinic constituents and a diluent having a greater solvent power than and preferentially dissolved in the solvent near one end of said zone, counterflowing the said mixture and the solvent under conditions producing raffinate and extract phases, removing diluent from the extract phase at at least one intermediate point of the extraction zone, and flowing the remaining portion of the extract phase through that part of the extraction zone situated between the point of introduction and the other end of the extraction zone countercurrently to a stream of a second solvent introduced near said end of the extraction zone under conditions causing the formation of new raffinate and extract phases.

7. The process according to claim 5, in which all diluent and all second solvent are removed from the respective phases and the remaining portions are mixed under conditions to produce phases of different compositions.

8. The process for extracting a liquid mixture to remove a component therefrom, which comprises extracting said mixture in an extraction zone by flowing it countercurrently to and in contact with concurrent streams of a selective solvent and a diluent having a greater solvent power than and preferentially dissolved in the solvent under conditions producing raffinate and extract phases, withdrawing at least a portion of the extraction mixture at an intermediate point in the extraction zone, removing diluent from the withdrawn mixture, and returning the remaining portion containing less diluent to the extraction zone at a point near the point of withdrawal.

9. The process for extracting a liquid mixture to remove a component therefrom, which comprises extracting said mixture in an extraction zone by flowing it countercurrently to and in contact with concurrent streams of a selective solvent and a diluent having a greater solvent power than and preferentially dissolved in the solvent under conditions producing raffinate and extract phases, withdrawing at least a portion of the extraction mixture at successive intermediate points in the extraction zone, removing diluent from the withdrawn mixtures, and returning the remaining portions containing less diluent to the extraction zone at points near the corresponding points of withdrawal.

10. The process according to claim 4 in which the second solvent is of the type of solvents not preferentially dissolved in the solvent for the first component.

11. The process according to claim 4 in which the second solvent is of the type of solvents preferentially dissolved in the solvent for the first component.

WILLEM J. D. van DIJCK.